United States Patent [19]

Troy

[11] Patent Number: 4,590,235
[45] Date of Patent: May 20, 1986

[54] DUAL-LAYER COATING CONTAINING ALUMINUM-FLAKE PIGMENT AND COATED ARTICLE

[75] Inventor: Daniel J. Troy, Wilmington, Del.

[73] Assignee: E. I. Du Pont de Nemours and Company, Wilmington, Del.

[21] Appl. No.: 721,215

[22] Filed: Apr. 8, 1985

Related U.S. Application Data

[63] Continuation of Ser. No. 612,658, May 21, 1984, abandoned, which is a continuation of Ser. No. 420,510, Sep. 20, 1982, abandoned, which is a continuation-in-part of Ser. No. 80,084, Sep. 28, 1979, Pat. No. 4,359,504.

[51] Int. Cl.$^4$ ............ C08K 3/08; C08K 5/56; C08K 7/06; C08K 5/07
[52] U.S. Cl. ................................ 524/439; 524/88; 524/364; 524/512; 524/523; 524/539; 524/560; 524/604
[58] Field of Search ............... 524/439, 441, 512, 539, 524/604

[56] References Cited

U.S. PATENT DOCUMENTS 3,932,347 1/1976 Camelon et al. ............ 524/441
3,941,731 3/1976 Camelon et al. ............ 524/441

Primary Examiner—Herbert J. Lilling
Attorney, Agent, or Firm—Donald W. Huntley

[57] ABSTRACT

A high-solids enamel coating on a substrate can give metallic glamor comparable to that imparted by conventional lacquer coatings containing metallic-flakes when the amount of metallic flake pigment in the enamel coating composition is increased over conventional amounts with a proportional increase in the amount of chromatic pigments.

7 Claims, No Drawings

4,590,235

DUAL-LAYER COATING CONTAINING ALUMINUM-FLAKE PIGMENT AND COATED ARTICLE

CROSS REFERENCE TO RELATED APPLICATIONS

This is a continuation of application Ser. No. 612,658, filed May 21, 1984, now abandoned, which is a continuation of application Ser. No. 420,510, filed Sept. 20, 1982, now abandoned, which is a continuation-in-part of U.S. application Ser. No. 080,084, filed Sept. 28, 1979, now U.S. Pat. No. 4,359,504.

BACKGROUND OF THE INVENTION

1. Field Of The Invention

This invention is related to dual-layer high-solids enamel coating systems containing aluminum-flake pigment which, when applied to a substrate and dried, result in coatings having excellent metallic glamor.

2. Description Of The Prior Art

Metallic glamor in the coating art refers to the property of a metallic-pigmented coating that causes the intensity of light reflected from the coated substrate to vary markedly according to the angle from which it is observed. This aesthetic property, which is particularly desired in automotive finishes, is largely the result of a non-random orientation of the metallic flakes in the dried coating, with most of the flakes positioned practically parallel to the coating surface. Heretofore, such orientation has been normally achieved only with low-solids lacquer or enamel coating systems which, although of excellent quality, have relatively high solvent content. Coating compositions in which the solvent content is low, usually 50% by weight of the composition or less, are normally enamel systems. These high-solids enamel systems, however, have been unable to achieve high-quality metallic glamor. The current environmental emphasis on solvent reduction highlights the continued need for a high-solids coating system which provides metallic glamor comparable to that of the lacquer systems.

SUMMARY OF THE INVENTION

The present invention provides an article having a substrate coated with an improved dual-layer high-solids enamel coating of the kind wherein the coating comprises (A) a cured base layer produced from a composition having
  (1) binder constituents consisting essentially of a first film-forming material and a crosslinker for the film-forming material wherein the film-forming material is selected from the group consisting of acrylic resins, polyester resins, and alkyd resins having a weight-average molecular weight of 500–10000;
  (2) a solvent for the binder constituents in an amount of no more than 100% by weight of the binder; and
  (3) chromatic and metallic-flake pigments;
and
(B) a cured transparent top layer, deposited on said base layer, produced from a composition having
  (1) binder constituents consisting essentially of a second film-forming material and crosslinker for the film-forming material wherein the film-forming material is selected from the group consisting of acrylic resins, alkyd resins, and polyester resins having a weight-average molecular weight of 500–10000; and
  (2) a solvent for the binder constituents in an amount of no more than 100% by weight of the binder,
wherein the improvement is characterized in that the metallic-flake pigment is present in the base layer in an amount of 6–24% by weight, based on the weight of the binder constituents of the base layer, and the chromatic pigment is present in an amount sufficient with the amount of the metallic-flake pigment to give the dual-layer coating a flake orientation index of at least 40.

DETAILED DESCRIPTION OF THE INVENTION

The improved dual-layer, high solids, pigmented coating composition of this invention achieves metallic glamor of a high quality which has heretofore not been produced in high-solids enamel systems. Metallic glamor is seen to an observer examining a coated substrate as a progressive darkening of the apparent color as the observer's viewing angle shifts from the normal. This effect results from an orientation of a great majority of the metallic flakes in the coating to positions within very small angles of the coating surface.

It is well known in the art that this preferred flake orientation is largely produced by shrinkage of the coating in a direction normal to the substrate that occurs as the volatile components of the coating composition evaporate. In conventional solution lacquer systems, for example, this shrinkage accounts for a 66% loss in thickness during solvent evaporation. In high-solids enamel systems, defined for purposes of this invention as coatings containing no more than 50% by weight of solvent, based on binder and solvent, the shrinkage can be as low as 28%, and the desired leveling action on the flake is diminished.

Metallic-flake pigments are usually present in coating compositions in an amount of about 0.5–2.5% by weight, based on the weight of the binder. Automotive topcoats, for example, also have a significant amount of chromatic pigment, the amount often varying according to the desired color. The usual levels of flake pigmentation, however, have been unable to reproduce the metallic glamor in high-solids enamels that has been achieved with lacquer coatings or low-solids enamels. It has now been found, however, that high-solids enamel coating systems of the kind having a pigmented base layer overlaid with an unpigmented top layer can achieve the desired metallic glamor when the amounts of both metallic-flake pigment and chromatic pigment in the base layer are increased by a factor of about 3–15 over the amounts of such pigments normally used in a particular metallic color system.

The present invention contemplates that the metallic flake be present in the pigmented base layer in an amount of about 6–24% by weight, based on the weight of the binder of the base layer. Preferably 10–20% by weight of flake is present. To impart the desired metallic glamor, the chromatic pigments must be present in an amount sufficient to hide the substrate with a color intensity that can appear dark enough, at viewing angles shifted from the normal, to provide the necessary contrast. Usually the chromatic pigment is present in the base layer in this invention in an amount of 0.5–85% by weight based on the weight of the binder of the base layer. The exact amount depends somewhat on the degree of transparency of the coating at various loadings of the chromatic pigment, which is in turn dependent on the color of the pigment.

Metallic glamor can be objectively measured with a special goniophotometer using the following geometrical arrangement. A coated test panel is positioned horizontally within the goniophotometer with the coated side facing up. The light from a circular, concentrated light source is collimated by a lens and is directed to strike the panel at a small angle, typically 22.5°, from the normal. The light beam reflected from the surface of the panel is directed by a second lens, at unity magnification, through a circular aperture having approximately the same diameter as the light source. A photocell is positioned at a distance of about 6-10 aperture diameters behind the aperture and is of sufficient size to intercept all light reflected from the panel through the aperture. The panel can be rotated to different viewing angles about an axis that is defined as the intersection of the plane of the panel and the plane defined by the beam of light incident to and reflected from the panel in its original horizontal position. It has been found particularly useful to measure the intensity of the reflected light at two different panel positions, when the panel has been rotated to positions of +10° and +60° from its initial horizontal position.

The goniophotometer gives unitless numerical readings known as luminous reflectance (G) for each angle from which the panel is viewed. The photocell is calibrated, with respect to the light source, to indicate a luminous reflectance of 100 for a nonmetallic, matte-surfaced, perfect white viewed at any angle setting. Nonmetallic coatings give equivalent reflectance readings from any angle of view.

In a coating having good metallic glamor, the reflectance measured at 10° will be greater than that measured at 60°. The reflectance at a given angle A° is related to another visual characteristic known as lightness (L) through the equation $$L(A°) = 25.29 G(A°)^{\frac{1}{3}} - 18.83$$

Goniophotometry, reflectance, and lightness are generally explained in *The Measurement of Appearance*, Hunter, R. S., John Wiley and Sons, New York 1975.

An objective characterization of the metallic glamor, the flake orientation index (F.O.I.), is in turn expressed as a function of the lightness of the coating at 10° and 60°. The mathematical expression is $$F.O.I. = 10 \, [L(10°) - L(60°)] / \left[ \frac{L(10°) + L(60°)}{2} \right]^{0.6}$$

The denominator of this expression is a normalizing term empirically determined to produce equal F.O.I. values for all coatings having the same metallic glamor, regardless of the color of the coating. It accounts for the color intensity of the coating and the ability of the coating to hide the substrate, both dependent on the amount of chromatic pigment. An index of at least 40, preferably 45, is desirable.

By way of comparison, commercial solution lacquer systems that have visually acceptable metallic glamor exhibit an F.O.I. of about 50. When the same flake-to-binder and chromatic pigment-to-binder weight ratios as used in this lacquer system are used in a conventional high-solids enamel system, the coating exhibits an unacceptably low F.O.I. of 29. A most preferred embodiment of the present invention, a blue metallic coating containing 16-20% by weight of aluminum flake and about 5% by weight of blue chromatic pigment (both based on weight of binder of pigmented base layer), exhibits a flake orientation index of 49. This coating has the same binder composition and binder-solvent ratio as the above conventional high-solids enamel, but the pigmentation level, flake and chromatic in the base layer is increased by a factor of 12.

The metallic-flake pigments used in the present invention can be any of the conventional flat metallic flakes. Examples are aluminum flakes, nickel flakes, tin flakes, silver flakes, chromium flakes, stainless steel flakes, gold flakes, copper flakes, or combinations of these. Preferred are aluminum flakes of the kind described, for example, in U.S. Pat. No. 2,662,027.

The chromatic pigments can be any of the conventional pigments used in coating compositions. Examples are iron oxide; metal hydroxides; sulfides; sulfates, carbonates; carbon black; phthalocyanine blues and greens; organo reds, and other organic dyes.

The pigments, both chromatic and metallic-flake, can be introduced into the coating composition by first forming a pigment concentrate or mill base with the film-forming resin, or with polymers compatible with the film-forming resin, used in the binder of the base layer. The metallic-flake pigment concentrate or mill base is preferably prepared by prolonged stirring with the polymeric portion of the concentrate or mill base. The chromatic pigment concentrate or mill base can be formed by conventional techniques such as sand grinding, ball milling, attritor grinding, or two-roll milling, to disperse the pigment in the vehicle. The pigment concentrate or mill base is then blended with the binder material in amounts appropriate to give the desired pigmentation levels.

The binder constituents of the two layers of the dual-layer enamel coating can be the same or different. Although the improvements of the present invention, imparted by the higher levels of metallic-flake pigments, would be evident in any binder system (film-forming resins and cross-linker), it is preferred that the binder systems have film-forming resins selected from the group of acrylic, alkyd, and polyester resins.

The acrylic resins useful as the film-forming resins in this invention are hydroxyl-functional copolymers having a weight average molecular weight of about 500-10000 determined by gel permeation chromatography. The copolymers are primarily of alkyl methacrylates and hydroxyalkyl acrylates or methacrylates, but may contain other monomers copolymerizable therewith.

The alkyl methacrylates useful in such resins contain 1-18 carbon atoms in the alkyl group. Typical are methyl methacrylate, ethyl methacrylate, butyl methacrylate, hexyl methacrylate, 2-ethylhexyl methacrylate, nonyl methacrylate, lauryl methacrylate, stearyl methacrylate, cyclohexyl methacrylate, isodecyl methacrylate, propyl methacrylate, phenyl methacrylate, and isobornyl methacrylate.

The hydroxy-functional monomers useful in the copolymer are hydroxy-alkyl esters of acrylic or methacrylic acid having 2-10 carbon atoms in the alkyl group. Preferred, however, are esters having 2-4 carbon atoms in the alkyl group with the hydroxyl group in the beta position. Examples are 2-hydroxy ethyl acrylate, 2-hydroxy propyl acrylate, 2-hydroxy butyl acrylate, 2-hydroxy ethyl methacrylate, 2-hydroxy propyl methacrylate, and 2-hydroxy butyl methacrylate.

The other monomers that can be copolymerized with the alkyl methacrylates and hydroxy-alkyl acrylates and methacrylates to form copolymers useful in this invention are vinyl acetate; olefins such as ethylene, propylene, and the like; conjugated dienes having 4–10 carbon atoms; aromatic hydrocarbons having vinylene groups, such as styrene; alkyl maleates; and alkyl esters of acrylic acid having 2–18 carbon atoms in the alkyl group. Small amounts of ethylenically unsaturated carboxylic acids can also be present, such as acrylic acid, methacrylic acid, crotonic acid, maleic acid, itaconic acid, and the like.

Crosslinking agents used with the hydroxyl-functional copolymers can be aminoplast resins or organic polyisocyanates. Preferred are aminoplasts such as alkoxymethyl melamines.

The aminoplasts are the alkylated products of amino resins, the latter prepared by the condensation of at least one aldehyde with at least one of urea, N,-N'-ethyleneurea, dicyandiamide, and an aminotriazine such as a melamine or a guanamine. Among the aldehydes that can be used are formaldehyde and its revertable polymers, acetaldehyde, crotonaldehyde, and acrolein.

The preferred aminoplasts are formed by alkylating the amino resins with from one to six alkanol molecules, each containing 1–6 carbon atoms. The alkanols can be straight-chain, branched, or cyclic. The most preferred members of this class are the methylated melamine-formaldehyde resins such as hexamethoxymethylmelamine.

The organic polyisocyanates that can be used as the crosslinker include aliphatic, cycloaliphatic, alkaryl, aralkyl, heterocyclic, and aryl di- or tri-isocyanates. Oligomers of these can also be used. Preferred from these classes are hexamethylene di-isocyanate or its trimer, methylene-bis-(4-cyclohexyl isocyanate), and isophorone di-isocyanate.

The relative amount of cross-linker to film-forming resin will depend largely on the amount of hydroxyl monomer in the copolymer. Normally, however, high solids enamel compositions have acceptable physical and chemical properties when the stoichiometrically necessary amount of cross-linker is from 5–50% of the total binder weight.

The alkyd resins which are useful as the film-forming resins of this invention are well known as including esterification products having fatty acid or oil constituents. The resins are usually the reaction product of a fatty acid or its glyceride, a polyol, and a polybasic acid. Alternatively, the alcoholosis product of a fatty acid glyceride and a polyol can first be formed and then further reacted with a polyol and polybasic acid by well-known methods to produce resins having a weight average molecular weight, determined by gel permeation chromatography, of about 500–10000. The alkyd resins can be formed from various mixtures of several different fatty acids, polyols, and polyacids.

The fatty acid glycerides are found in castor oil, dehydrated castor oil, coconut oil, cottonseed oil, peanut oil, tung oil, linseek oil, soya oil, etc. The fatty acids derived from these and like oils are straight-chain monocarboxylic acids having a total of 8 to 12 carbon atoms. The acids can be saturated or mono- or polyunsaturated. When the acids are unsaturated, derived from the so-called drying oils, crosslinking is also effected through air oxidation.

The polybasic acids that are used generally are dicarboxylic acids having the general formula

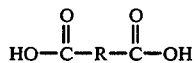

wherein R is alkylene, vinylene, aromatic, carboxylic, or heterocyclic. Anhydrides or dialkyl esters of these acids can also be used. Examples of such acids are glutaric, adipic, pimelic, succinic, maleic, itaconic, phthalic, isophthalic, terephthalic, cumidic, hexahydrophthalic, tetrahydroththalic, and the like.

The polyols that can be used are, for example, any of the various diols such as ethylene glycol; propylene glycol; 1,3 propane diol; 1,2-butanediol, 2,3 butane diol; and 1,4 butanediol. Triols, such as glycerine, or other higher functional alcohols can also be used. The diols are preferred.

The crosslinker used with these alkyd resins can be any of the aminoplasts or organic polyisocyanates described earlier. As with the acrylic resins, from about 5–50% by weight of the crosslinker, based on the combined weights of the crosslinker and alkyd resin, ae used in the enamel compositions.

Either or both layers of the dual-layer enamel coating of this invention can be produced from a polyester film-forming material also. Polyester resins used herein are prepared by the condensation reaction of polybasic acids and polyols. The weight-average molecular weight of these resins, which can be prepared by any of the conventionally known processes for polyester production, should be about 500–10000, as determined by gel permeation chromatography.

The polyols used in preparation of the polyesters are preferably diols that can be either aliphatic or aromatic. Suitable diols include ethylene glycol; propylene glycol; 1,3 propane diol, any of the butanediols; neopentyl glycol; 2,2,4-trimethyl-1,3-pentane diol; 2,2-diethylpropane-1,3-diol; 2-methyl-2-propylpropane-1,3-diol; decamethylene glycol; dodecamethylene glycol; monoethyl ether of glycerine, alpha, beta-alkyl ethers of glycerol, and the like. Triols or other more highly functional polyols can also be used.

The polybasic acids used are normally dibasic carboxylic acids that are either aliphatic (saturated or not). or aromatic. Suitable acids include, for example malonic, succinic, glutaric, adipic, pimelic, suberic, azelaic, sebacic, brasylic, maleic, fumaric, diphenic, tetrachlorophthalic, phthalic, terephthalic, isophthalic, cyclohexane-1,2-dicarboxylic acid, p-phenylene diacetic, naphthalene dicarboxylic acid, beta-methyl adipic acid, trimethyl adipic acid, and the like.

Anhydrides, acid chlorides, or dialkyl esters of the above acids can also be used. Preferred polyesters are formed from both aliphatic and aromatic acids with mixtures of polyols. Blends of polyester resins, some formed only from polyols and aromatic acids, some formed only from polyols and aliphatic acids, can also be used.

Crosslinkers used with the polyester resins can be the same as those described for the hydroxyl-functional acrylic or alkyd systems.

Although the preferred film-forming resins for use in the present dual-layer enamel systems are hydroxyl-functional acrylic, polyester, or alkyd resins, it is to be understood that any conventionally used film-forming constituents, with appropriate crosslinkers, can be used.

For example, resins that are epoxy-functional can be used, crosslinked with a diacid, and conversely, resins that are acid-functional can be crosslinked with an epoxy resin. Other variations of the resins are also possible.

Each of the coating layers of the present dual-layer enamel system is formed from a high-solids composition containing at least 50% by weight of binder constituents (film-forming resins and crosslinker) based on the combined weight of binder and solvent. The solvents that can be used are typically organic, inert to the binder constituents, and sufficiently volatile to be easily evaporated during the curing process when the film-forming resins are completing crosslinking. Specific examples are toluene, acetone, ethyl acetate, methyl isobutyl ketone, methylethyl ketone, and ethyl alcohol. Any of the other conventionally used cycloaliphatic or aromatic hydrocarbons, esters, ethers, ketones, or alcohols are also suitable.

The coating compositions can be formulated by conventional means. For example, the acrylic resins useful in this invention are typically formed by co-polymerizing the monomers in one of the above inert organic solvents in the presence of a free-radical forming initiator. The crosslinking agent and mill base, for the pigmented layer, are then blended into the composition.

The coating composition for either layer or both layers can optionally contain an ultraviolet light stabilizer, an antioxidant or both. The ultraviolet light stabilizer can be present in an amount of 1-20% by weight, based on the weight of the binder; the anti-oxidant can be present in an amount of 0.1-5% by weight, based on the weight of the binder.

Typical ultraviolet light stabilizers are benzophenones, triazoles, triazines, benzoates, lower alkyl thiomethylene-containing phenols, substituted benzenes, organophosphorous sulfides, and substituted methylene malontriles. Particularly useful are the hindered amines and nickel compounds shown in U.S. Pat. No. 4,061,616 (Dec. 6, 1977).

Typical antioxidants are tetra-kis alkylene (di-alkyl hydroxy aryl) alkyl ester alkanes, reaction product of p-amino diphenylamine and glycidyl methacrylate, and alkyl hydroxyphenyl groups bonded through carboalkoxy linkages to a nitrogen atom of a heterocyclic nucleus containing an imidodicarbonyl group or an imidodithiocarbonyl group.

One preferred combination of ultraviolet light stabilizer and antioxidant is 2-hydroxy-4-dodecyloxy benzophenone or a substituted 2(2'-hydroxyphenyl) benzotraizole and tetra-kis methylene 3(3',5'-dibutyl-4'-hydroxyphenyl) propionate methane.

The coating compositions for either layer or both layers may optionally contain additives to control rheology during and after application of the composition to a substrate. Examples of such rheology control agents include additives containing fumed silica, such as disclosed in U.S. Pat. No. 4,238,387 to Antonelli et al., and polymer microparticles, such as disclosed in U.S. Pat. Nos. 4,220,679 to Backhouse and 4,180,619 to Markhlouf. The fumed silica can be present in an amount of 1 to 15% by weight, based on the weight of the coating composition. The polymer microparticles may be present in an amount of at least 10% of the aggregate weight of film-forming polymer and polymer microparticles. Combinations of such additives may also be used.

The coating composition of each layer of this invention can be applied to a substrate by any well-known means, but spraying is preferred. The pigmented base layer is first applied to a substrate and preferably cured to a degree sufficient to effect substantial solvent evaporation and crosslinking. Curing is normally carried out by baking or heating the layer for 10-60 minutes at 50°-200° C. Before baking, it is often preferable to allow the base layer to flash at room temperature, 23° C., for up to 15 minutes. This facilitates the flake orientation.

The transparent top layer is applied directly over the base layer, preferably after the base layer is cured. It is important that the solvents of the transparent top layer do not attack the base layer. This attack, or strike-in, can cause the film-forming resins of the two layers to combine at the layers' interface, and can destroy the desired flake orientation in the base layer. As stated above, it is preferably to cure the base layer such that crosslinking occurs to a degree sufficient to make the base layer immune to attack from the solvent in the top layer.

After the top layer is applied, baking is carried out as with the base layer, with optional flashing of the coating before the bake, to completely cure both layers. The top layer not only provides depth to the coating, enhancing the metallic glamor, but also increases the gloss and distinctness-of-image over values obtainable if only a single pigmented layer were used. The metallic glamor is evident, however, even when no transparent top layer is used.

The following Example illustrates the invention.

EXAMPLE

Control Coating A

A conventional acrylic solution lacquer can be prepared according to Example 1 of U.S. Pat. No. 3,823,205, with the exception that the pigment dispersion is made by blending together the following two mill bases:

|  | Parts by Weight |
| --- | --- |
| Mill Base 1, prepared by blending | |
| Aluminum Flake | 3.2 |
| Polymethyl Methacrylate | 12.8 |
| Toluene/Acetone (70/30) | 25.8 |
|  | 41.8 |
| Mill Base 2, prepared by sand grinding | |
| Monastral ® Blue Pigment | 0.85 |
| Polymethyl Methacrylate | 1.45 |
| Toluene/Acetone (70/30) | 4.37 |
|  | 6.67 |

This lacquer coating has an aluminum flake/binder ratio of 1.5/100 and an aluminum flake/chromatic pigment weight ratio of 3.75/1.0. The lacquer is thinned to 12% volume solids with a conventional solution lacquer thinner and is sprayed onto a primed aluminum panel. Four coats are applied to the panel, three passes per coat, allowing a flash of two minutes between coats and a flash of ten minutes after the last coat is applied. The coating is then baked for 20 minutes at about 155° C.

Control Coating B

A pigmented high-solids enamel coating is prepared by conventional means to have the following final composition:

|  | Parts by Weight |
| --- | --- |
| Acrylic Polymer Solution, prepared by conventional means, wherein the polymer solution has a weight solids content of 74%, the polymer is a copolymer of methyl methacrylate, n-butyl acrylate, and 2-hydroxyethyl acrylate having a weight average molecular weight of 3000 and a glass transition temperature of −10° C. | 70 |
| Hexamethoxymethylmelamine | 30 |
| Methylethyl Ketone | 107.6 |
| Aluminum Flake Pigment | 1.23 |
| Monastral ® Blue Pigment | 0.33 |
|  | 209.16 |

The enamel coating has a binder solids content of 65% by weight, based on weight of binder and solvent, and has an aluminum flake/binder weight ratio of 1.5/100 and a chromatic pigment/binder weight ratio of 0.4/100. The enamel is sprayed onto a primed aluminum panel in four coats, two passes per coat, allowing a flash of two minutes between coats and a flash of thirty minutes after the last coat is applied. The coating is then baked for thirty minutes at 71° C. and for thirty additional minutes at 163° C.

Dual-Layer High-Solids Enamel

1. A pigmented base-layer coating is prepared by conventional means to have the following composition:

|  | Parts by Weight |
| --- | --- |
| Acrylic Polymer Solution (described in Coating B) | 70 |
| Hexamethoxymethylmelamine | 30 |
| Methylethyl ketone | 107.6 |
| Aluminum Flake Pigment | 14.76 |
| Monastral ® Blue Pigment | 3.96 |
|  | 226.32 |

This enamel composition has a binder solids content of 65% by weight, based on weight of binder and solvent, and has an aluminum flake/binder weight ratio of 18/100 and a chromatic pigment/binder weight ratio of 4.8/100.

2. An unpigmented top-layer coating composition is prepared as is the base layer but without pigmentation.

The pigmented base-layer enamel composition is sprayed onto a primed aluminum panel in one coat, two passes per coat, allowing a flash of 15 minutes after the coat is applied. The coating is then baked for thirty minutes at 71° C. and for thirty additional minutes at about 93° C. The unpigmented top-layer enamel composition is then sprayed over the base-layer in four coats, two passes per coat, allowing a flash of two minutes between coats and a flash of fifteen minutes after the last coat is applied. The coating is then baked for thirty minutes at 71° C. and for thirty additional minutes at 163° C.

The flake orientation index of the coatings on each of the three panels is determined using a goniophotometer as previously described. Control Coating A (a solution lacquer with conventional pigmentation levels) exhibits a flake orientation index of 52. Control Coating B (a high-solids enamel with conventional pigmentation levels) exhibits an index of 29. The dual-layer high-solids enamel having pigmentation levels within the range of the present invention exhibits a flake orientation index of 49.

I claim:

1. In a high-solids enamel coating composition having
    (1) binder constituents consisting essentially of a film-forming material and a crosslinker for the film-forming material wherein the film-forming material is selected from the group consisting of acrylic resins, polyester resins, and alkyd resins having a weight-average molecular weight of 500–10,000;
    (2) a solvent for the binder constituents in an amount of no more than 100% by weight of the binder; and
    (3) chromatic and metallic-flake pigments;
the improvement wherein the metallic-flake pigment is present in the composition in an amount of 10–24% by weight, based on the weight of the binder constituents, and the chromatic pigment is present in an amount sufficient with the amount of the metallic-flake pigment to give a cured coating of this composition a flake orientation index of at least 40.

2. The composition of claim 1 wherein the film-forming material is a polyester resin.

3. The composition of claim 2 wherein the film-forming material is a polyester resin that is a mixture of the condensation products of (1) aliphatic diols and aliphatic dibasic acids, and (2) aliphatic diols and aromatic dibasic acids, and wherein the crosslinker is an aminoplast.

4. The composition of claim 1 wherein the film-forming material is an acrylic resin.

5. The composition of claim 4 wherein the film-forming material is a copolymer of an alkyl acrylate, alkyl methacrylate, and at least one of a hydroxy alkyl acrylate and hydroxy alkyl methacrylate, and wherein the crosslinker is an aminoplast.

6. The composition of claim 1 in which the film-forming material is an alkyd resin.

7. The composition of claim 6 wherein the film-forming material is an alkyd resin that is the reaction product of a glyceride of a fatty acid, a diol, and a dicarboxylic acid.

* * * * *